United States Patent [19]
Isono et al.

[11] Patent Number: 5,315,377
[45] Date of Patent: May 24, 1994

[54] THREE-DIMENSIONAL IMAGE DISPLAY USING ELECTRICALLY GENERATED PARALLAX BARRIER STRIPES

[75] Inventors: Haruo Isono; Minoru Yasuda, both of Tokyo, Japan

[73] Assignee: Nippon Hoso Kyokai, Tokyo, Japan

[21] Appl. No.: 883,465

[22] Filed: May 15, 1992

[30] Foreign Application Priority Data

Oct. 28, 1991 [JP] Japan .................. 3-281496

[51] Int. Cl.⁵ .................. H04N 13/04; H04N 15/00
[52] U.S. Cl. .................. 348/51; 345/139; 348/54; 348/17; 348/586
[58] Field of Search .................. 358/3, 88, 92, 85, 183, 358/903; 340/729; 345/139; H04N 13/04, 15/00

[56] References Cited

U.S. PATENT DOCUMENTS

| | | | |
|---|---|---|---|
| 4,717,949 | 1/1988 | Eichenlaub | 358/3 |
| 4,829,365 | 5/1989 | Eichenlaub | 358/3 |
| 5,036,385 | 7/1991 | Eichenlaub | 358/3 |
| 5,083,199 | 1/1992 | Börner | 358/88 |

*Primary Examiner*—Howard W. Britton
*Attorney, Agent, or Firm*—Antonelli, Terry, Stout & Kraus

[57] ABSTRACT

A display apparatus for displaying a three-dimensional image includes an image display section for displaying an image in response to an input image signal and for displaying a three-dimensional image in response to an input three-dimensional image signal when a three-dimensional image display mode is set, and a barrier display section having a barrier display liquid crystal panel of the transmitting type, for displaying a parallax barrier onto the barrier display liquid crystal panel so that a part of the three-dimensional image which is displayed by image display means can be observed from a gap of the parallax barrier in the three-dimensional image display mode.

39 Claims, 14 Drawing Sheets

FOR 2 VIEW POINTS

FOR 3 VIEW POINTS

FOR 6 VIEW POINTS

VARIABLE PITCH BARRIER

CONVEX BARRIER

CONCAVE BARRIER

THREE-DIMENSIONAL IMAGE DISPLAY USING ELECTRICALLY GENERATED PARALLAX BARRIER STRIPES

BACKGROUND OF THE INVENTION

1. Field of the Invention

The invention relates to a three-dimensional display of an image by the parallax barrier system and, more particularly, to a method of three-dimensionally displaying an image by electrically generating a parallax barrier and an apparatus for such a method and also relates to a method of using such an apparatus.

2. Description of the Related Art

As a three-dimensional (hereinafter, also abbreviated to 3D) image display system which doesn,t need to use special glasses, there are several systems such as a lenticular system, a barrifocal mirror system, an integral photography system, a holography system, and so on. Among them, the present invention relates to the parallax barrier system. Therefore, the descriptions of the other systems are omitted because they are not directly concerned with the invention.

In the parallax barrier system, a stereogram display surface is observed by a viewer through a plurality of very thin vertical stripe-shaped aperture slits from the position which is away therefrom by only a predetermined distance. Elements of the image to be observed by both of the right and left eyes of the viewer are alternately displayed like vertical stripes onto the stereogram display surface. Such a construction is generally called a parallax stereogram. An amount of information recorded in the parallax stereogram is merely equal to the amount which corresponds to the right and left eyes, in other words, the amount which is twice as much as the information of a plane image. It cannot be always said, on the other hand, that the movement of a view point is also free. To eliminate the above drawbacks, therefore, W. Kanolt has proposed in 1918 a method of displaying a three-dimensional image which is named parallax panoramagram. According to such a method, in the parallax panoramagram, an aperture ratio of the aperture slit is reduced to a value within, for instance, about a range from 1/6 to 1/10 and images which have been photographed from many different directions are sequentially arranged like vertical stripes onto the stereogram display surface in units of elements of the images. At this time, a three-dimensional image of the directional resolution within a range from 6 to 10 is obtained.

The conventional 3D image display apparatus of the parallax barrier system, however, has the following problems. That is, when a new 3D image display apparatus will be used as a future 3D television display apparatus, it would be necessary that programs of the three- and two-dimensional display system could be displayed. On the other hand, when the new 3D image display apparatus is used as a display terminal of the computer graphics, CAD/CAM, or work station, it is necessary that the apparatus can display a 3D images. However, in the conventional 3D display apparatus of the parallax barrier system, the parallax barrier is generally formed on a film like and multi-directional continuous images which are displayed on the background of the barrier are observed through the barrier. Therefore, in such a conventional display apparatus, there is a problem such that when an ordinary 2D image is displayed on the display surface, the parallax barrier becomes an obstacle and the 2D image cannot be seen. That is, the conventional 3D image display apparatus of the parallax barrier system has a problem such that it doesn't have the compatibility with the 2D image display apparatus. Consequently, when the display apparatus should be commonly used as both of a 3D display terminal of the computer and a 2D image display apparatus like a television, a point regarding whether the display apparatus has the compatibility of the display such that the 2D image and/or 3D image can be displayed or not will be an extremely important problem in future. In addition, it is also demanded for the 3D display apparatus that both of the 3D image and the 2D image can be mixedly displayed in the same screen so as to correspond to multimedia.

In the conventional 3D image display apparatus of the parallax barrier system, after the shape, position, and the like of the barrier were once determined, they cannot be easily changed. In the conventional 3D display apparatus, it is impossible to dynamically cope with the change of an arbitrary number of view points from the double-eye system to the multi-eye system based on the number of observers.

The conventional parallax barrier system further has problems such that the vertical stripe-shaped aperture slits become an annoying and bothersome, an amount of light transmittance decreases due to the slits, and a bright stereoscopic image cannot be seen.

SUMMARY OF THE INVENTION

The present invention is made in consideration of the above circumstances and it is an object of the invention to provide a method of easily realizing the 2D display and/or 3D display of an image by electronically and variably controlling the appearance and disappearance of a parallax barrier and an apparatus for such a method and also to provide a method of using such an apparatus.

To accomplish the above object, a display apparatus for displaying a three-dimensional image according to the invention includes: an image display section for displaying an image in response to an input image signal and for displaying a three-dimensional image in response to an input three-dimensional image signal when a three-dimensional image display mode is set; and a barrier display section having a barrier display liquid crystal panel of the transmitting type for displaying a parallax barrier onto the barrier display liquid crystal panel so that the three-dimensional image which is displayed by the image display section can be observed from a gap of the parallax barrier in a three-dimensional image display mode.

According to the invention, as for the barrier display section, when the image display section displays a mere two-dimensional (2D) image, the appearance of the parallax barrier is inhibited and the barrier generating surface can be constructed by a colorless transparent panel. In the barrier display section, the number of parallax barriers, width aperture ratio, shape including the interval, and generating position can be freely programably controlled in accordance with an instructed input. Further, the head position of the observer who observes the 3D image is monitored and each time the observer moves to the right or left by only the interval between the pupils, the phase of the parallax barrier of the barrier display section can be inverted. A density of parallax barriers can be also variably controlled.

In addition, according to the present invention, an "active barrier" system in which two liquid crystal display panels are laminated is provided as a 3D image display system which doesn't need to use any glasses. A 3D image having a parallax is displayed on the liquid crystal panel surface of the first layer. A stripe barrier is electronically generated on the liquid crystal panel surface of the second layer. The image on the liquid crystal panel surface of the first layer can be stereoscopically seen. Further, since the generation of the stripe barrier can be electrically programably changed, a 3D image of an arbitrary number of view points ca be displayed.

Moreover, there is a compatibility such that a two-dimensional image can be also displayed without reduction of the resolution. In addition, both of the 3D image and the 2D image can be also mixedly displayed in the same screen so as to cope with the multimedia use.

DETAILED DESCRIPTION OF THE PREFERRED EMBODIMENTS

A three-dimensional image display apparatus of the parallax barrier system according to the invention will be described in detail hereinbelow with reference to the drawings.

A construction of a three-dimensional image display apparatus 1 according to an embodiment of the invention will be first described with reference to FIG. 1.

Figure 6A:
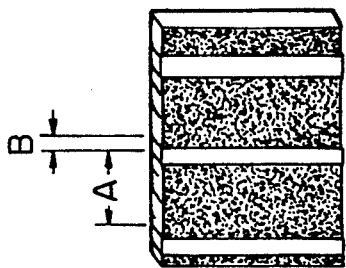
FIGS. 6A to 6C are diagrams for explaining a change in parallax barrier according to the number of view points.
Figure 6B:
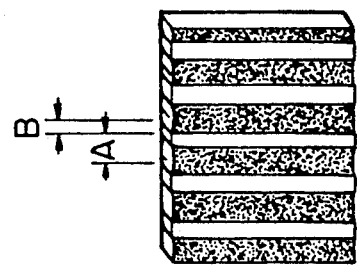
Figure 6C:
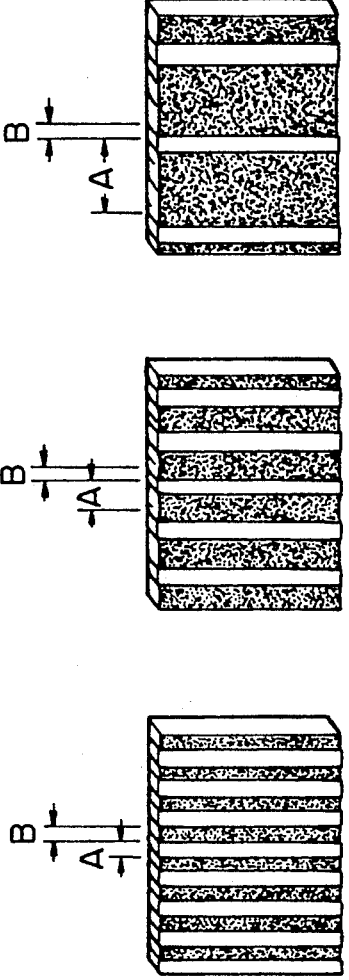
Figure 6E:
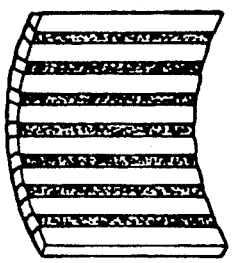
FIGS. 6D to 6F are diagrams for explaining the surface shape of the display section 100.
Figure 6F:
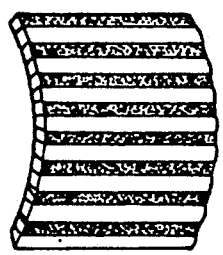

A display section 100 includes two liquid crystal display panels 28 and 46 of a transmitting type having the same distance between image elements, that is, the same pixel pitch in this embodiment and an image enlarging section 56 of a transparent material arranged between the panels 28 and 46. The panel 28 is a monochromatic panel. The panel 46 is a color panel. a monochromatic panel may be also used as the panel 46. The light from a light source 52 is irradiated to the panel 46 from the backside of the panel 46 when it is seen or observed from a viewer 400. A two-dimensional image is displayed on the panel 46 in the two-dimensional display mode (2D mode). A three-dimensional image is displayed on the panel 46 in the three-dimensional display mode (3D mode). In addition to the 2D and 3D modes, there are mixture modes ((2+3)D mode and (2+3)D mode in which both of the 2D image and the 3D image are mixedly displayed. The surface of the display section 100 may be formed into either a convex shape as shown in FIG. 6E or a concave shape as shown in FIG. 6F.

Figure 6D:
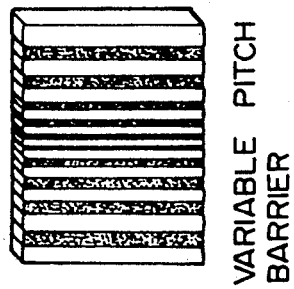
Figure 7A:
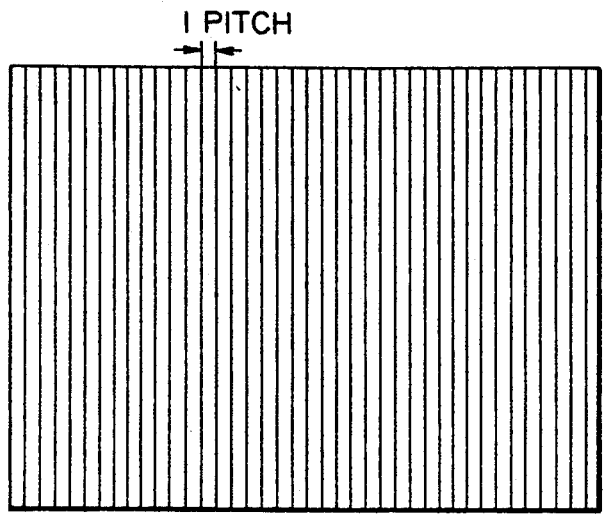
FIGS. 7A to 7C are diagrams for explaining a form of a barrier which is displayed on a barrier display panel 28 of a display section 100.
Figure 7B:
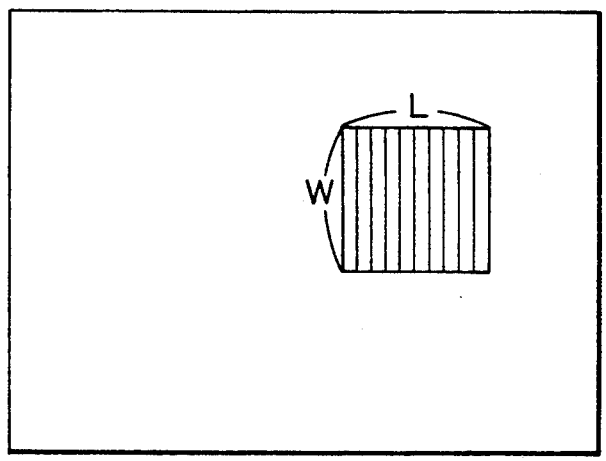
Figure 7C:
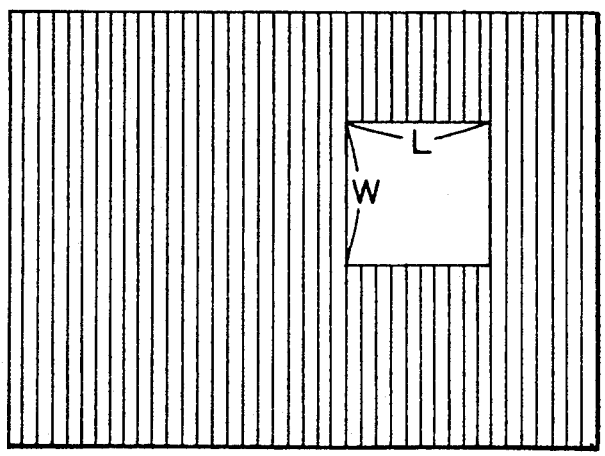

A parallax barrier is electrically and programably displayed on the whole screen of the panel 28 in the 3D mode and a portion of the screen in the (2+3) or (2+3)D) mode. FIG. 7A shows an example of the stripe barrier which is displayed on the panel 28 in the 3D mode. FIG. 7B shows a barrier generated in only a window, that is, a portion on the screen in the (2+3)D mode. The position and size of the window shown in FIG. 7b can be freely changed. When the window is used, an ordinary 2D image can be displayed in the portion other than the window. On the contrary, in the (2+3)D mode, an ordinary 2D image is displayed within a window and a 3D image is displayed on a part other than the window. No parallax barrier is displayed in the 2D mode. The apparatus, consequently, can be also used as a 2D image display apparatus. In the embodiment, the parallax barrier is a vertical stripe-shaped barrier. At least a ratio 6:1 or more is needed as a contrast ratio of the barrier and the opening portion (portion without any barrier). When the contrast ratio is less than 6:1, a crosstalk occurs and the image on the panel 46 cannot be stereoscopically seen. FIGS. 6A to 6C show a change according to the number of view points of the parallax stripe barrier to be generated. In a special case, a barrier of a variable pitch can be also generated as shown in FIG. 6D.

The enlarging section 56 electrically and dynamically enlarges the image displayed on the panel 46. In the parallax barrier system, generally, in order to observe the image stereoscopically from a position of a finite distance, a width I of an element, e.g., the pixel in this embodiment, of the image on the panel 46, namely, must be slightly wider than an width B of an opening of the barrier on the panel 28, that is, B<I. If the panels 46 and 28 have the same pixel pitch (I=B), the enlarging section 56 slightly enlarges the width I of the 3D image displayed on the panel 46 and forms the enlarged image having a width of IP. A focal distance is controlled so as to satisfy the condition of B<IP. When an interval D between the panels 28 and 46 has been predetermined, even if a distance C between the viewer 400 and the panel 46 changes, the image can be stereoscopically observed within a wide distance range by controlling a magnification of the enlargement. Although the actual value of B/IP is less than 1, it is fairly close to 1.

A computer 20 controls the whole operation of the apparatus 1 and can also execute various arithmetic operating processes. The computer 20 is connected to other various kinds of external apparatuses through a compression-expansion/multiplexing circuit 54, an interface 12, and a communication line 16. A TV mode setting unit 2, a pay per view unit 4, an input unit 6, and a head position detecting unit 8 are connected to the computer 20. The setting unit 2 is a unit which is provided by, for instance, a contract and holds identification data (ID data). The ID data in the multiplexed data of the multiplexed TV signal is compared with the ID data held in the setting unit 2, thereby checking whether they coincide or not. In response to the result of the comparison, the setting unit 2 generates a display control command to the computer 20 on the basis of control data in the multiplexed data. The pay per view unit 4 has therein a timer. When a commercially available recording medium 14 such as a IC card, disk, or the like is purchased by a viewer and is inserted into the unit 4, the timer generates a display control command which is optimum to see and listen to the program in the 3D display mode recorded in the medium 14 to the computer 20 in response to the start time of such a program. The unit with no timer 4 may be connected to a separating circuit (to be described later). In this case, the ID data in the multiplexed data is compared with ID data in the medium 14 to generate the display control command. The input unit 6 includes a keyboard, a mouse, or a remote controller and generates various display control commands to the computer 20 in accordance with the operation of the viewer 400. The detecting unit 8 detects the head position of the viewer and generates a display control command to the computer 20 when the head position of the viewer has moved by only a distance E between the right and left eyes.

A storage unit 10, the interface 12 and a voice signal converting circuit 86 connected to a speaker 83 and a microphone 84 are connected to the computer 20 through the compression-expansion and multiplexing-demultiplexing circuit 54. The storage unit 10 has a recording medium such as a magnetooptic disk of a write once read many WORM type, a magnetic tape, or the like. A compressed digital image signal, a multiplexed signal, and data are recorded onto the recording medium together with data from registers 80-1 to 80-5. In a reading mode, the compressed image signal which has been read out from the recording medium is supplied to the circuit 54. In a writing mode, the compressed image signal from the circuit 54 is recorded onto the recording medium. an analog voice signal from the microphone 84 is converted into a digital voice signal by the converting circuit 86 and supplied to the circuit 54. The digital voice signal from the circuit 54 is converted into the analog voice signal by the converting circuit 86 and outputted as a voice from the speaker 83. The circuit 54 which is controlled by the computer 20, compresses a digital image signal supplied through the computer 20 and outputs the compressed signal to the storage unit 10 and/or the communication line 16 through the interface 12. When the digital voice signal and the digital image signal are supplied thereto, the circuit 54 compresses those signals, multiplexes the compressed signals and transmits the multiplexed signal to the storage unit 10 and/or the communication line 16 via the interface 12. When the multiplexed signal is received from the communication line 16 through the interface 12, the voice signal and the image signal are demultiplexed and expanded by the circuit 54. The expanded voice signal is sent to the converting circuit 86. The expanded image signal is supplied to the storage unit 10 and/or the computer 20. The multiplexed signal from the storage unit 10 is also similarly processed and supplied to the interface 12 and/or the computer 20.

In response to an input command, the computer 20 controls an image data processor 32 to control image display, a controller 22 to control the generation of a barrier, and a controller 58 to control the enlarging section 56. Since the computer 20 is used as not only a control unit but also an arithmetic operation processing unit, in order to reduce the load, the control of each section is executed by the processor 32 and the controllers 22 and 58.

In response to an input display control command, the computer 20 sets display mode data, window data, view point count data, signal kind data, and input/output data as control data into registers 80-1 to 80-5 of the processor 32 and also sets the display mode data, the window data, and the view point count data as control data into registers 22-1 to 22-3 of the controller 22. Even when the display control command is supplied from the communication line 16 through the interface 12 the computer 20 sets the control data. The display mode data includes data 2D, 3D, (2+3)D and (2+3)D data corresponding to the 2D mode, 3D mode, (2+3)D mode, and (2+3)D mode, respectively. The window data includes 0 data in the case where no window is set and coordinate data indicative of the position and size of the window when it is actually set. The number of view points is stored as view point count data. The view point count data is set to "0" in the 2D mode. The signal kind data includes data EAV indicative of the display of an analog TV signal, data IAV indicative of an analog image signal from a TV camera unit 9, data EDV indicative of the display of a digital signal from an external apparatus through the interface 12, and data IDV indicative of the display of a digital signal from the storage unit 10. The input/output data includes data IN, OUT, and IN+OUT indicative of the input, output, and input/output of the digital signal.

In accordance with the control data set in the registers 22-1 to 22-3, the controller 22 drives a driver 26 for a horizontal position control and a driver 24 for a vertical position control so that a parallax barrier is displayed on the liquid crystal display panel 28 synchronously with an input sync signal. When the 2D data is set in the register 22-1, since the controller 22 doesn't drive both of the drivers 24 and 26, no barrier is displayed on the panel 28. When the 3D data is set in the register 22-1, the controller 22 drives both of the drivers 24 and 26 in accordance with the view point count data set in the register 22-3 and controls the panel 28 so as to display a desired barrier in the window. When either the (2+3)D data or (2+3)D data is set in the register 22-1, the controller 22 drives both of the drivers 24 and 26 in accordance with the window data set in the register 22-2 and the view point count data set in the register 22-3, thereby controlling the panel 28 so as to display a barrier inside or outside of the window. When the parallax barrier is displayed, the stripe barrier can be also set into N gradations (N≧3) instead of a binary gradation of black and white. Consequently, a loss of light amount which is caused due to a decrease in aperture ratio of the stripe barrier can be reduced. In the above case, it is necessary that the stripe barrier has a contrast enough to separate the image.

When a rotation command from the input unit 6 or a phase shift command from the detecting unit 8 is supplied as a display control command, the computer 20 generates a barrier movement command to the controller 22. In response to the barrier movement command, the controller 22 drives the drivers 24 and 26 in such a manner that the parallax barrier displayed on the panel 28 is shifted to the right or left by a distance corresponding to one pixel in a real-time manner. When a distance change command is supplied as a display control command from the input unit 6, the computer 20 generates a magnification change command to the controller 58. In response to the magnification change command, the controller 58 drives a driver 57 so that the image can be stereoscopically observed from a position of the designated distance.

The apparatus 1 has input terminals 64-1 to 64-n for view point signals $VP_1$ to $VP_n$. The multiplexed TV signal received by an antenna 60 is separated into an analog image/voice signal and a data signal by a separating circuit 62. The data signal is supplied to the setting unit 2. The image signal in the analog image/voice signal is supplied to the terminal 64-1 in accordance with the data EAV in the register 80-4. Since the same circuit as a well-known circuit can be used as a circuit for processing the voice signal, its description is omitted. The apparatus 1 also includes the TV camera unit 9 having two TV cameras. The analog image signals of images photographed by the two TV cameras are supplied to a multiplexing and A/D converting circuit 74 through the terminals 64-1 and 64-2 in accordance with the data IAV of the register 80-4, respectively. The circuit 74 A/D-converts the analog image signals into digital image signals in accordance with the data EAV or IAV in the register 80-4 in synchronism with an input sync signal. When the data in the register 80-4 is EAV, the circuit 74 directly supplies the digital image signal to a selector 76 and a bus driver 82. When the data in the register 80-4 is IAV, the circuit 74 converts the digital image signals into a three-dimensional (3D) digital image signal in unit of pixel in accordance with the data "2" in the register 80-3, namely, two view points and, thereafter, supplies the resultant 3D digital image signal to the selector 76 and the bus driver 82. The driver 82 outputs the 3D digital image signal to the computer 20 in accordance with the output data OUT or the input-/output data IN+OUT in the register 80-5. By this, the digital image signal can is not only displayed but also stored into the storage unit 10. Or, the digital image signal can be also transmitted to an external apparatus through the interface 12 and the communication line 16.

The analog image signal supplied to the terminal 64-1 is also sent to a sync signal detector 66. The detector 66 detects a sync signal and transmits to a selector 70. A sync signal generator 68 generates a sync signal and supplies to the selector 70. In accordance with the data EAV, IAV, EDV, or IDV in the register 80-5, the selector 70 transfers the sync signal from the detector 66 or the generator 68 to the processor 32, controllers 22 and 38, and circuit 74. When the signal kind data is EAV or IAV, the sync signal from the detector 66 is outputted. When the signal kind data is EDV or IDV, the sync signal from the generator 68 is outputted.

The digital image signal from the computer 20 is also supplied to the selector 76 through the bus driver 82. That is, the digital image signal from the external apparatus through the interface 12 and the communication line 16 or the digital image signal from the storage unit 10 can be displayed. The selector 76 transfers the digital image signal from the circuit 74 or the bus driver 82 to the processor 32 in accordance with the signal kind data in the register 80-4.

The processor 32 has the registers 80-1 to 80-5 and is connected not only to the computer 20 but also to a video memory VRAM 34, adjustment switches 36, a controller 38, a driver 50, and the like in order to control display of the digital image signal. In accordance with the data set in those registers, the processor 32 controls the operation of the circuits connected thereto. Adjustment switches for horizontal synchronization, vertical synchronization, luminance, hue, contrast, and the like are included in the adjustment switches 36. When the data (2+3)D or (2+3)D is set in the register 80-1, the processor 32 automatically adjusts the luminance of a 3D part of the display image signal inside or outside of the window so as to become the higher luminance by only a value determined in accordance with window data and view point count data in the registers 80-2 and 80-3 irrespective of the set value of the luminance adjustment switch among the switches 36. This is because when a 3D image is displayed partially, a 3D image display portion becomes dark due to the parallax barrier since a difference between the luminance of the 2D image display portion and the 3D image display portion is too large. When the 3D image is displayed on the whole screen, that is, when the data in the register 80-1 is 3D, the processor 32 drives the driver 50 in a such manner that a light amount from the light source 52 is more than that in the case of the 2D image display. With an increase in number of view points, the loss of light amount by the barrier stripes increases. In such a case, it is sufficient to control the driver 50 so as to decrease luminance of the 3D display image in correspondence to the number of view points by increasing the light amount from the light source 52 provided on the backside of the liquid crystal panel 46. Since the luminance of the display image decreases almost like an exponential function with an increase in number of view points, the luminance can be also automatically compensated on the basis of the view point count data in the register 80-3.

The processor 32 transmits the digital image signal from the selector 76 to the controller 38. One image element of the digital image signal, that is, one pixel has gradation data of four bits in the present embodiment. The controller 38 supplies the image signal and a horizontal scan signal to a modulator 40 under the control of the processor 32. The modulator 40 modulates the input image signal in accordance with the gradation data. A driver 42 drives the liquid crystal panel 46 for image display in response to the horizontal scan signal and the modulated image signal. A driver 44 drives the panel 46 in the vertical direction in response to a vertical scan signal from the controller 38. Thus, an image is displayed onto the panel 46 by use of the light from the light source 52.

The principle to stereoscopically observe an image through the parallax barrier will now be described with reference to FIG. 2 prior to explaining the operation of the 3D image display apparatus according to the invention. The image signals $VP_1$ and $VP_2$ are supplied to the input terminals 64-1 and 64-2, respectively. Although it has been described in the above embodiment that the analog image signal is supplied to the terminals 64-1 to 64-n, the signals $VP_1$ to $VP_n$ is assumed to be digital image signals for convenience of explanation.

The signals $VP_1$ and $VP_2$ are the image signals which are derived when an object is observed from the directions of a right eye OR and a left eye OL, respectively. The signal $VP_1$ relates to a train of image elements $R_1$, $R_2$, $R_3$, ... and the signal $VP_2$ relates to a train of image elements $L_1$, $L_2$, $L_3$, ... The image elements $R_1$, $L_2$, $R_3$, $L_4$, ... are selected from those image elements by the multiplexer 74 and are displayed on the image display panel 46. A plurality of vertical stripe-shaped barriers having an extremely thin width A are displayed on the barrier display panel 28. An interval between the stripe barriers is equal to B and is called an aperture slit. An interval between the image display surface of the panel 46 and the barrier display surface of the panel 28 is equal to D. The viewer 400 is at the position which is away from the image display surface by the distance C and observes the displayed image through the aperture slits by both eyes OR and OL. That is, the right eye OR looks at the pixels $R_1$, $R_3$, $R_5$, ... and the left eye OL looks at the pixels $L_2$, $L_4$, $L_6$, ... Thus, an image called a parallax stereogram can be observed. A distance between both eyes OR and OL is equal to E.

Figure 2:
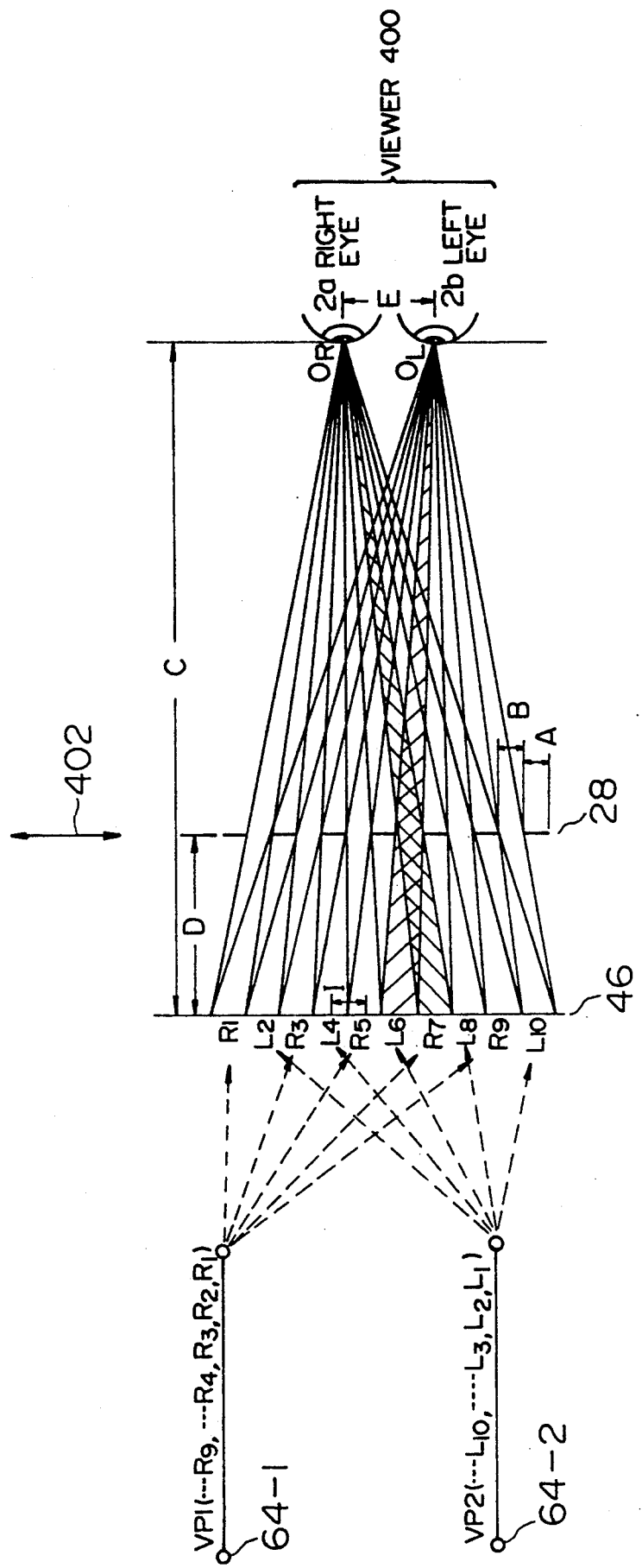
FIG. 2 is a diagram for explaining the principle of the stereoscopic image display of the parallax barrier system with respect to a 3D image of two view points as an example.

In FIG. 2, the interval D between the image display surface and the barrier display surface is set as follows.

$$D = (I \cdot C)/(E + I) \quad (1)$$
$$= C/\{1 + (E/I)\}$$

The distance E between both eyes is equal to about 6.5 cm. I indicates a central distance between the pixels on the image display surface, that is, a pixel pitch. On the other hand, the width B of the opening of the stripe barrier is as follows.

$$B = \{(C-D)/C\} \cdot I \quad (2)$$

Figure 3:
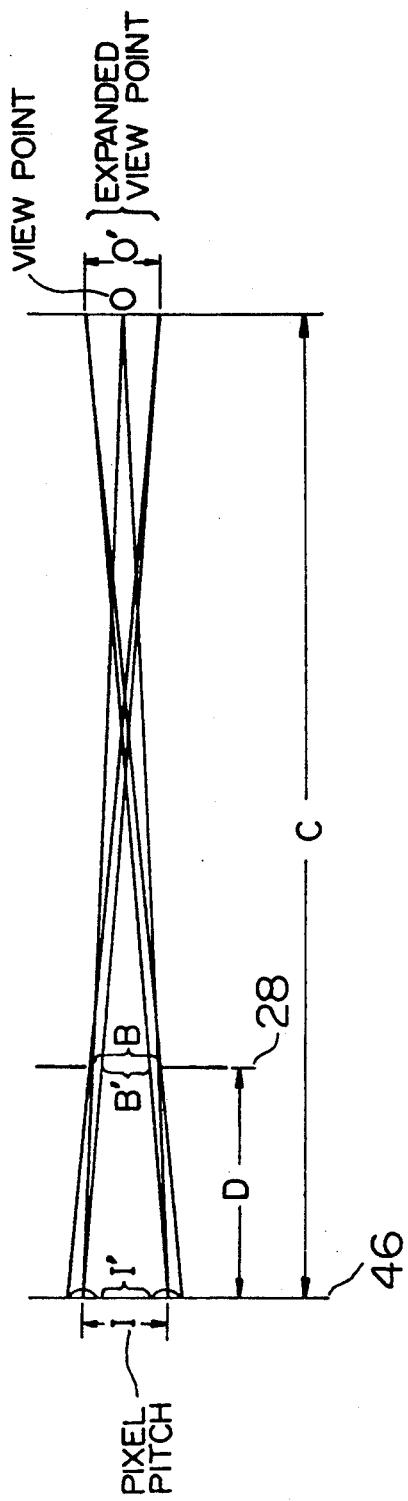
FIG. 3 is a diagram for explaining the relation between the width of aperture slit and the pixel pitch when considering an extent of the view points in FIG. 2.

On the other hand, since a view point O of the viewer actually has a finite extent (size O') as shown in FIG. 3, an opening width B' of the actual barrier is corrected as shown by the following equation.

$$B' = I \cdot \{(C-D)/C\} - (D/C) \cdot O' \quad (3)$$

An actual pixel interval I' of the stereogram display surface is also corrected as shown by the following equation.

$$I' = I - \{B'/(C-D)\} \cdot O' \quad (4)$$

Figure 4:
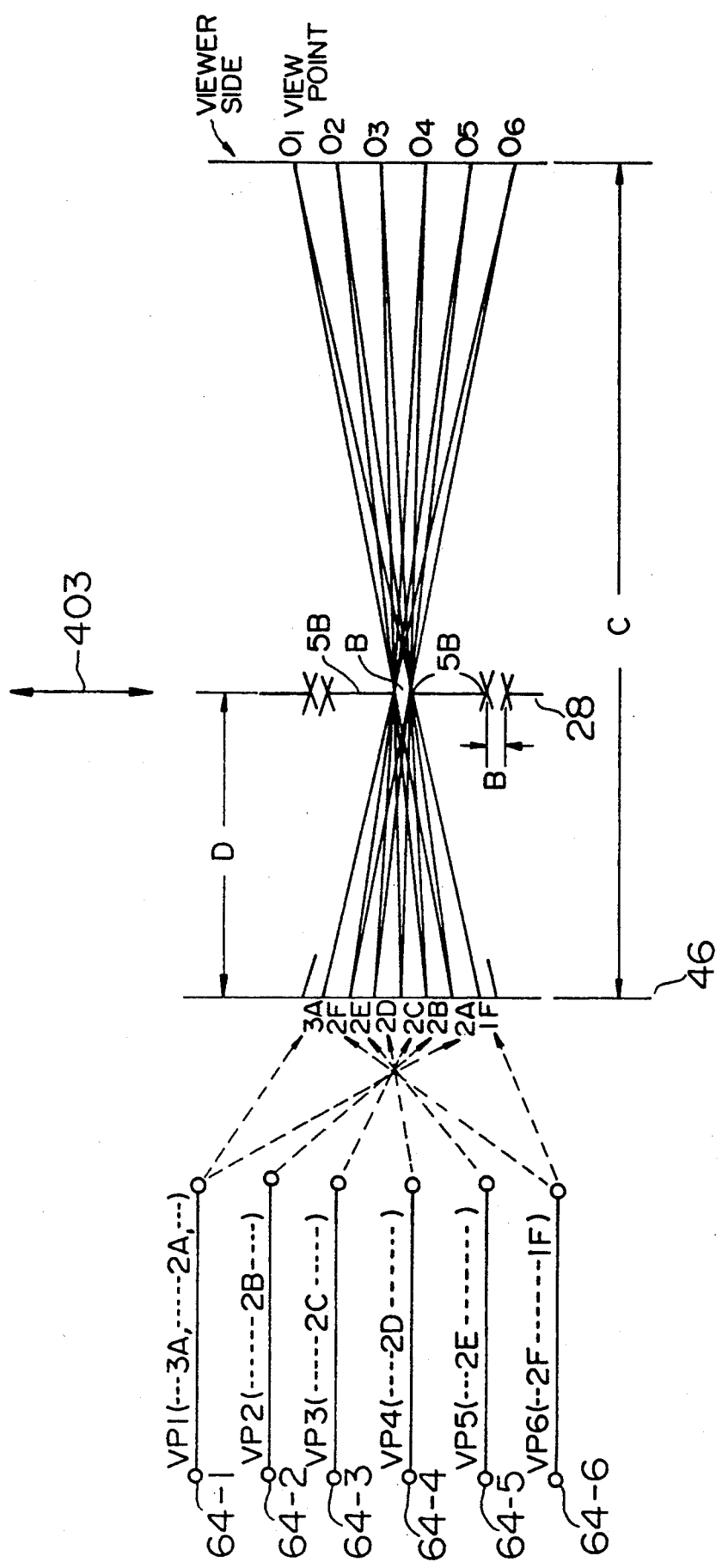
FIG. 4 is a diagram for explaining the principle of the stereoscopic image display of the parallax barrier system with respect to a 3D image of six view points as an example.

An amount of information recorded in the parallax stereogram is equal to an amount corresponding to only two right and left eyes, namely, an amount which is merely twice as large as an information amount of a plane image. The movement of the view point is also not always free. To eliminate the above drawbacks, accordingly, a method of continuously displaying a three-dimensional image has been proposed. According to the method, the image signals $VP_1$ to $VP_6$, for instance, are supplied from six input terminals 64-1 to 64-6, respectively. An image which is derived by the method is called a parallax panoramagram. The signals $VP_1$ to $VP_6$ are image signals when an object is observed from the directions of the view points $O_1$ to $O_6$, respectively. The signals $VP_1$ to $VP_6$ are signals including image elements 2A, 2B, 2C, 2D, 2E, and 2F. Those image elements exist at the positions which are deviated by every distance corresponding to one image element. The image elements 2A, 2B, 2C, 2D, 2E, and 2F are selected from pixel elements by the multiplexer 74 and displayed on the image display panel 46. A plurality of stripe barriers having a width 5B are displayed on the barrier display panel 28. An interval between the stripe barriers is equal to B and an aperture ratio is equal to 1/6. The viewer 400 observes the image displayed through the aperture slits from the view points $O_1$ to $O_6$. That is, the image element 2A is seen from the view point $O_1$, the image element 2B from the view point $O_2$, and so on. According to the above method, as shown in FIG. 4, the images photographed from a plurality of directions are continuously displayed on the display panel 46, so that a 3D image from multi-view points is obtained.

The operation of the 3D image display apparatus of the invention will now be described. The case where the 3D image display apparatus according to the invention is used as a receiver of a TV image signal will be first described.

In the 2D mode, the computer 20 sets the 2D data, 0 data, 0 data, EAV data, and OUT data into the registers 80-1 to 80-5 in response to the display control command from the unit 2, 4, or 6. Since the same data as those in the registers 80-1 to 80-3 are set into the registers 22-1 to 22-3, their descriptions are omited in the following explanation. A two-dimensional image is, consequently, displayed in the display section 100 without a parallax barrier. In the 3D mode, the 3D data, 0 data, two view point data, EAV data, and OUT data are set into the registers 80-1 to 80-5, respectively. Thus, a three-dimensional image of two view points is displayed in the display section 100 by the parallax barrier. In the (2+3)D or (2+3)D mode, the computer 20 sets the (2+3)D or (2+3)D data, coordinate data of the window, two view point data, EAV data, and OUT data into the registers 80-1 to 80-5, respectively. Thus, a 2D image is displayed in the display section 100 without a parallax barrier in a region out of the window and a 3D image of two view points is displayed in the window by the parallax barrier in the (2+3)D mode and the 2D and 3D images are reversely displayed in the (2+3)D mode. When a write command is given from the input unit 6 together with the display control command, the digital image signal is stored into the storage unit 10 through the driver 82. When a transmission command is given, the digital image signal can be also transferred to an external apparatus via the communication line 16 and the interface 12.

The case where the 3D image display apparatus according to the invention is used as a TV telephone system or TV meeting system will now be described. In such a case, the display mode data, window data, and view point count data in the registers 80-1 to 80-3 are received from the external apparatus via the interface 12 and are set by the computer. Data (IAV+EDV) and (IN+OUT) are set into the registers 80-4 and 80-5, respectively. In response to the communication command from the input unit 6, the computer 20 transfers the image signal from the bus driver 82 to the circuit 54. The voice from the viewer 400 is also sent to the circuit 54 through a microphone 84 and the converting circuit 86. The image signal and the voice signal are compressed and multiplexed and the multiplexed signal is transmitted to the external apparatus through the interface 12. The multiplexed signal received from the external apparatus is separated by the circuit 54 and expanded. The expanded voice signal is outputted as a voice from the speaker 83 through the converting circuit 86. The expanded digital image signal is sent to the selector 76 via the bus driver 82 and displayed in the display section 100 in accordance with the data in the registers 80-1 to 80-3. In this instance, when the write command is supplied from the input unit 6 to the computer 20, the multiplexed signal can be stored into the storage unit 10.

The case where the 3D image display apparatus according to the invention is used as a false experience apparatus will now be described. The stored control data is set into the registers 80-1 to 80-3 together with the stored image signal. The data IDV and the data IN are set into the registers 80-4 and 80-5. The image signal stored in the storage unit 10, consequently, can be displayed in the display section 100. The voice signal is generated from the speaker 83 through the circuits 54 and 86. For instance, when the viewer 400 doesn't have an enough time although he wants to travel abroad, a foreign travel can be falsely experienced by the voice and the stereoscopic image with the reality more than that in the conventional system so long as the multiplexed signal including the images of noted places of a desired foreign country and the narrations to explain them has been stored in the storage unit 10.

The operation of the head position detecting unit 8 will now be described. As shown in FIG. 2, it is now assumed that the 3D image of two view points is displayed. The detecting unit 8 detects the head position of the viewer by using a sensor of infrared rays, magnetism, or the like. When the right eye OR is at the position as shown in FIG. 2, the image elements $R_1$, $R_3$, $R_5$, ... are observed through the aperture slits by the right eye OR. However, when the right eye OR moves to the position of the left eye in FIG. 2, that is, when the head position of the viewer moves by the distance E (about 6.5 cm) between both eyes, image elements $L_2$, $L_4$, $L_6$, ... can be observed through the aperture slits. When the movement of the head position is detected, the detecting unit 8 generates a barrier phase shift command to the computer 20. In response to the barrier phase shift command, the computer 20 controls the controller 22 so as to shift the position of the stripe barrier by a distance corresponding to one image element. Thus, even when the head position of the viewer moves by the distance E between both eyes, the image elements $R_1$, $R_3$, $R_5$, ... can be observed through the aperture slits. A normal 3D display image is obtained in a wide range. The same shall also apply to the (2+3)D or (2+3)D image.

The rotation of the 3D display image will now be described. It is now assumed that a 3D image of six view points is displayed as shown in FIG. 4. When the view point is located at the position of $O_1$, the image element 2A can be observed. At this time, when the position of the aperture slit is moved upward on the figure by only the distance of one image element, the image element 2B when it ought to be observed from another direction can be observed. As mentioned above, when a rotation command is given from the input unit 6 to the computer 20 in the case where a 3D image of multiview points, namely, a 3D image of six view points in the example is displayed, the computer 20 controls the controller 22 so as to shift the position of the stripe barrier by the distance of one image element in response to the rotation command. Consequently, the viewer can easily observe the rotated stereoscopic image by electronically moving the display position of the barrier stripe even when the viewer doesn't change the position. The same effect as that in the case where the head of the viewer is moved is obtained. The same shall also apply to the (2+3)D or (2+3)D image.

Figure 8A:
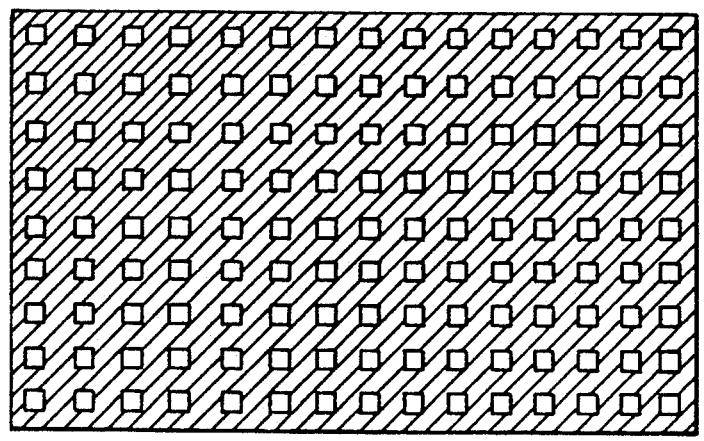
FIGS. 8A and 8B are diagrams for explaining another form of a barrier which is displayed on the barrier display panel 28 of the display section 100.
Figure 8B:
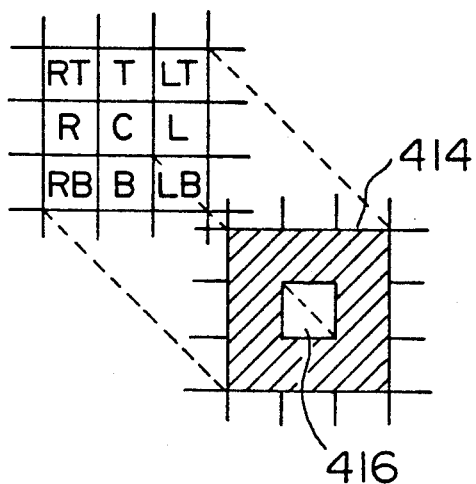

In the above description, the parallax barrier has a stripe shape. However, the shape of parallax barrier is not limited to the stripe shape. Other shapes of the parallax barrier will now be described hereinbelow. The barrier in this case, has a lattice-shaped two-dimensional pattern in both of the horizontal and vertical directions as shown in FIG. 8A instead of a one-dimensional pattern in the vertical direction. FIG. 8B is an enlarged diagram showing a portion of FIG. 8A. In the example of FIG. 8A, an opening portion 416 is formed in the central portion of a square block of 3×3 elements. A 3D image displayed on the background of the 2D barrier can be seen through the opening portion 416. The 3D image which is displayed on the background is a stereoscopic image having a parallax between both eyes in not only the horizontal direction but also the vertical direction. That is, in the above case, when the view point is moved in the vertical direction, a stereoscopic image from such a direction can be also seen. Such a state is regarded as a barrier corresponding to the function of a "eyes of a fly" lens in the case of the lenticular system. Although FIG. 8A shows the example of the square block of 3×3 elements, a two-dimensional barrier having another arbitrary shape can be also obviously generated. The generating region, generating position, and the like of the 2D barrier can be also freely varied by the computer 20.

Figure 9:
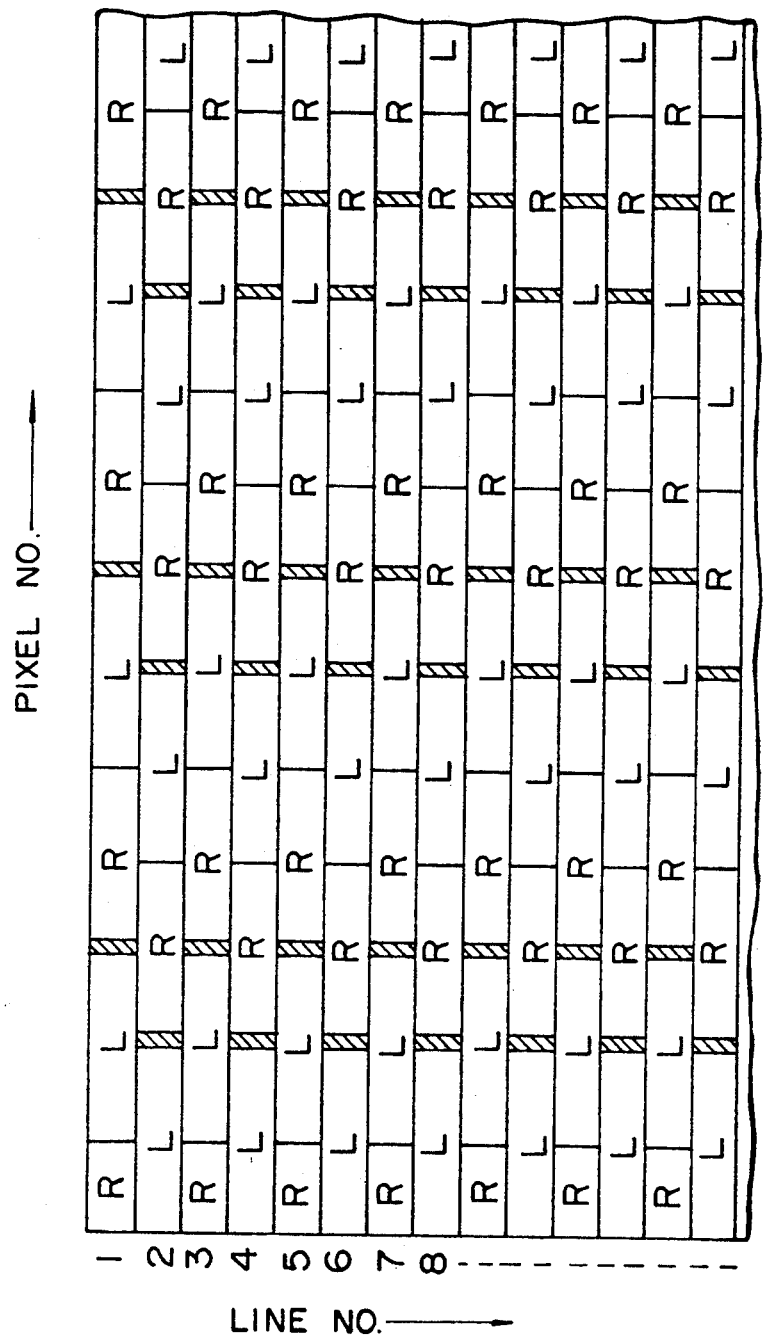
FIG. 9 is a diagram for explaining a pixel arrangement of liquid crystal panels 28 and 46 used to improve the horizontal resolution.

The improvement of the resolution of a stereoscopic image will now be described. A pixel arrangement of each of the liquid crystal display panels 28 and 46 is constructed such that the pixels are deviated by ½ pixel in the horizontal direction every line as shown in FIG. 9. By deviating the pixels by ½ pixel every line by using such a construction, the apparent horizontal resolution of the stereoscopic image can be improved without increasing the number of whole pixels of the liquid crystal display panels 28 and 46. Consequently, a resolution similar to that of the 2D image is also derived with respect to the 3D image.

Figure 5:
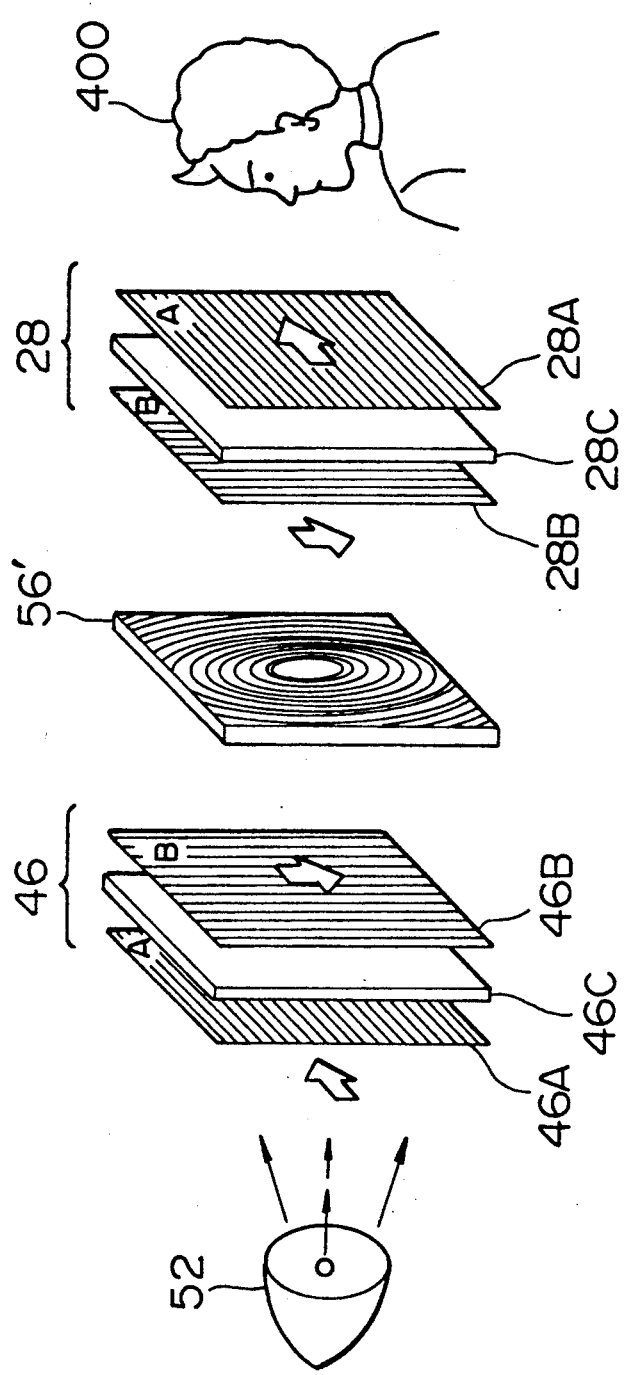
FIG. 5 is a diagram for explaining a construction of a display section 100 shown in FIG. 1.

FIG. 5 shows a modification of the display section 100. In the modification, a Fresnel lens 56' of a fixed magnification is used in place of the enlarging section 56, driver 57, and controller 58. The panels 46 and 28 are arranged at a distance of only a predetermined interval. The Fresnel lens 56' is inserted into the gap between the panels 46 and 28. The Fesnel lens has a function of a flat convex lens to slightly enlarge the size of stripe-shaped stereoscopic image displayed on the LCD panel 46. A liquid crystal section 28C of the LCD panel 28 is sandwiched by two polarizing plates 28A and 28B whose polarizing directions cross perpendicularly to each other. A liquid crystal section 46C of the LCD panel 46 is sandwiched by two polarizing plates 46A and 46B whose polarizing directions cross perpendicularly to each other. As shown in FIG. 5, the liquid crystal panels 28 and 46 are arranged so that the polarizing directions of the polarizing plates 28B and 46B coincide.

Figure 10:
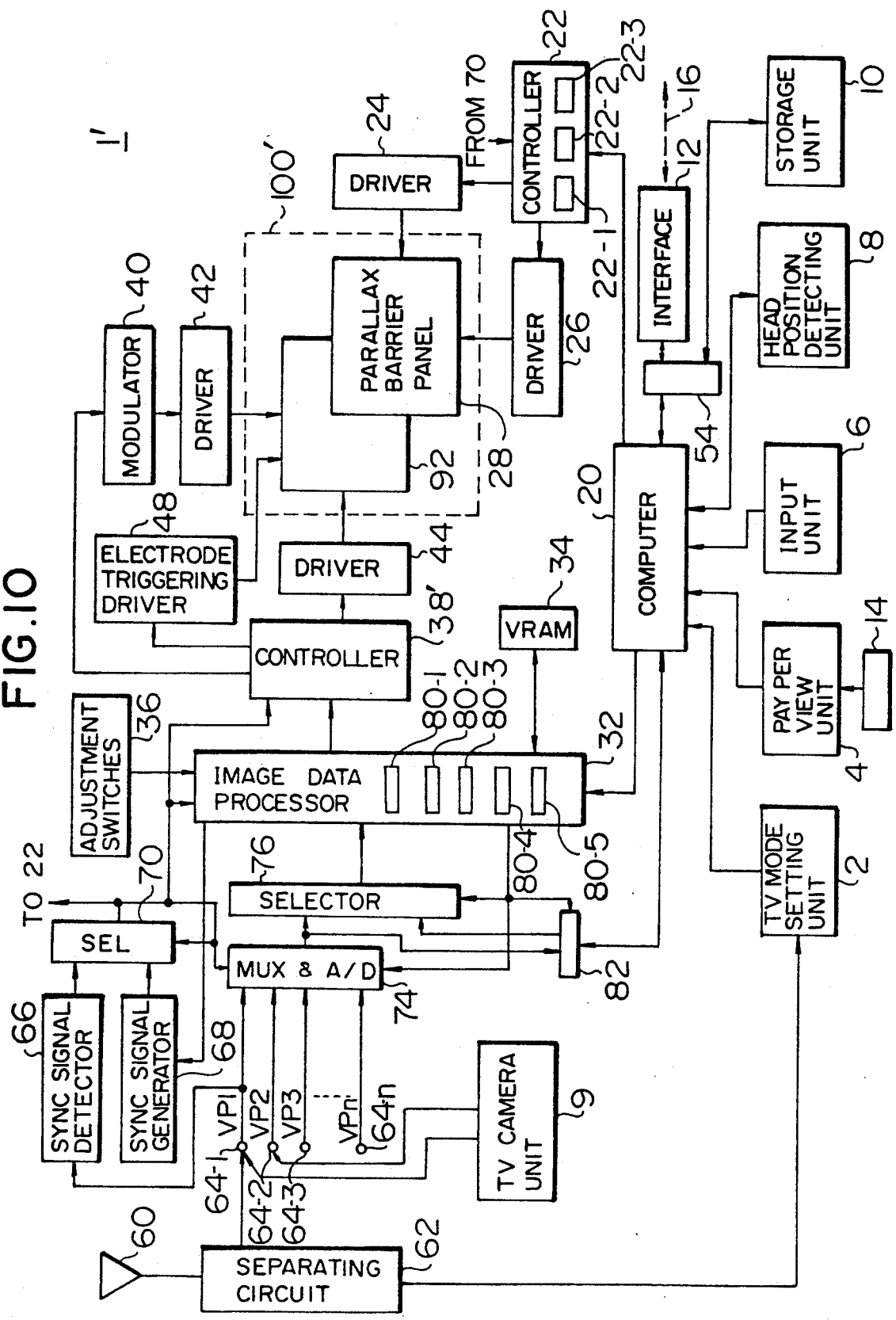
FIG. 10 is a diagram showing a modification of a 3D image display apparatus according to the invention using a plasma display panel.

A 3D image display apparatus 1' using a stereoscopic image display section 100' as a modification of the stereoscopic image display section 100 will now be described with reference to FIG. 10. In FIG. 10, the same components as those shown in FIG. 1 are designated by the same reference numerals and their descriptions are omitted here. Therefore, only points different from the 3D image display apparatus 1 shown in FIG. 1 will be described. The speaker 83, microphone 84, and converting circuit 86 are omitted in FIG. 10.

Figure 1:
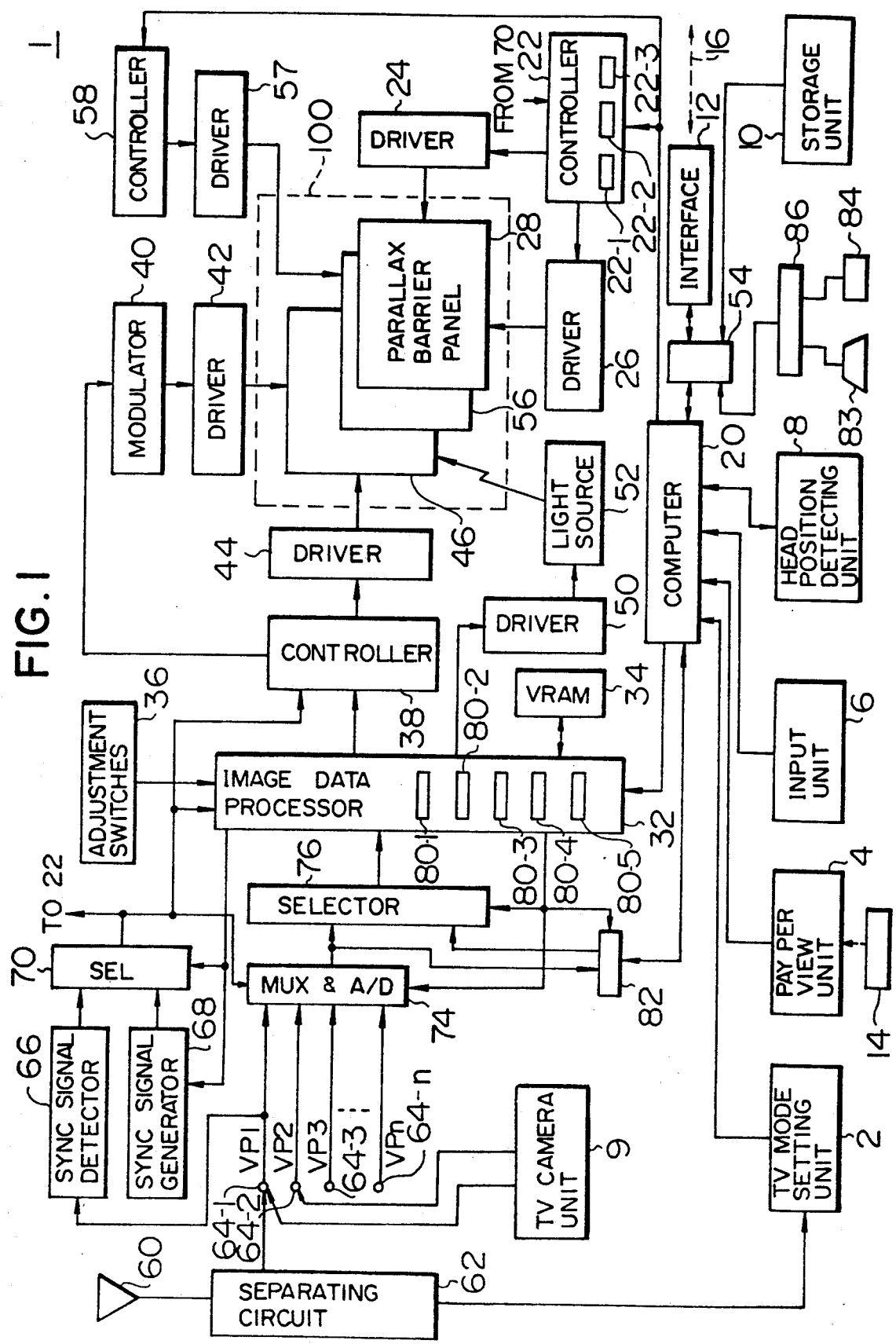
FIG. 1 is a diagram showing a 3D image display apparatus according to the invention.

In the modification, a plasma display panel (PDP) 92 is used in place of the liquid crystal display panel 46 for image display in FIG. 1. Therefore, the driver 50 and the light source 52 are omitted and in place of them, a driver 48 to trigger an electrode of a plasma display tube is added. A controller 38' is used in place of the controller 38. The controller 38' controls and drives the modulator 40 and the drivers 42, 44, and 48 in accordance with the display data from the processor 32 and a sync signal. A 3D image is, consequently, displayed on the PDP 92 and provided for the viewer. In the modification, a width of one pixel of the PDP 92 is wider than that of the LCD panel 28 by only a predetermined magnification.

Figure 11:
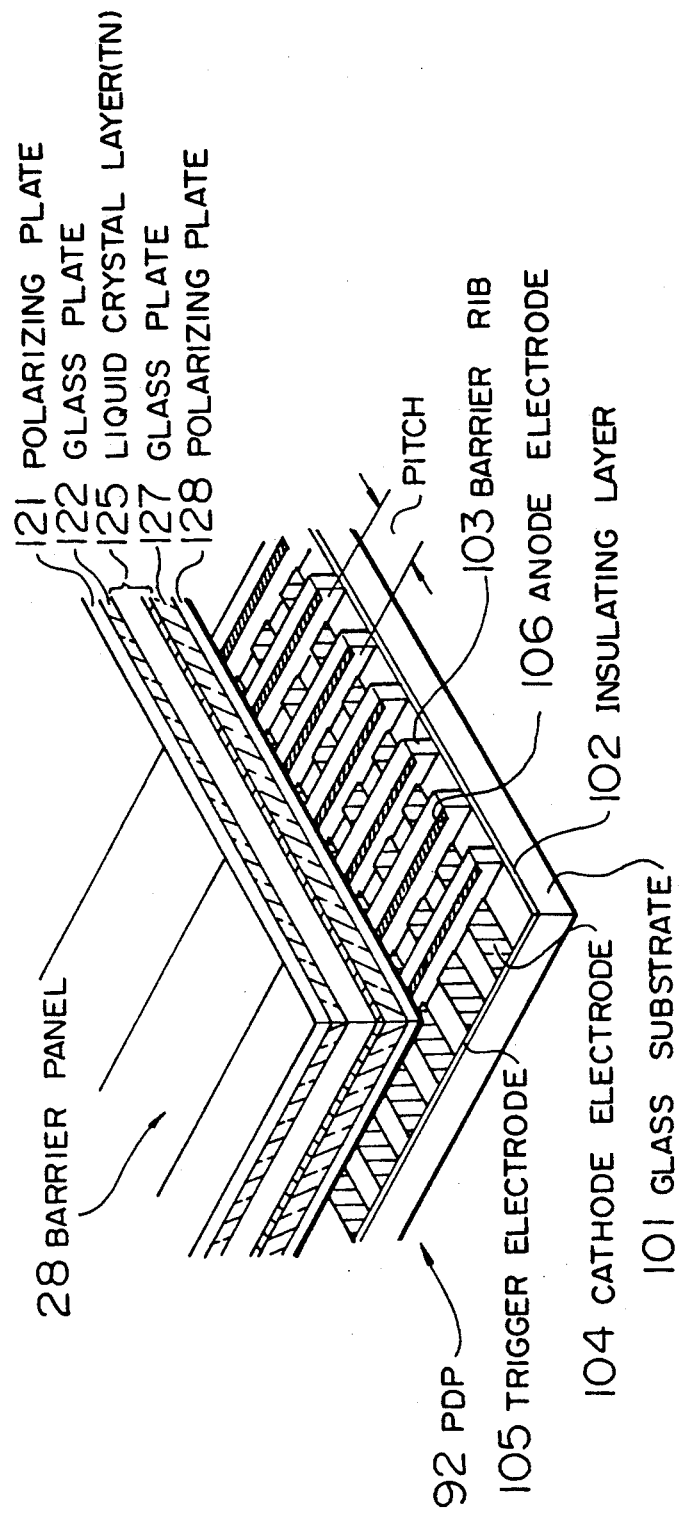
FIG. 11 is a diagram showing a display section 100' of the modification shown in FIG. 10.

FIG. 11 shows a constructional example of the display section 100' when the PDP 92 and the panel 28 to electronically generate a barrier are integrated. A plurality of barrier ribs 103 are formed as a PDP of the display section 100' in a predetermined direction onto an insulating layer 102 on a glass substrate 101. An anode electrode 106 is formed on each barrier rib 103. A cathode electrode 104 and a trigger electrode 105 are alternately formed on the insulating layer 102 in such a direction as to perpendicularly cross the barrier ribs 103. The liquid crystal barrier panel 28 is provided over the PDP 92 so as to have a predetermined interval. As shown in the diagram, the panel 28 is formed by sandwiching a layer 125 of the TN liquid crystal by a set of a polarizing plate 128 and a glass plate 127 and a set of a polarizing plate 121 and a glass plate 122.

In the description of the modification, although the display panel of the image data is changed to the PDP, the display section 100' can be also constructed by using a flat display panel such as EL (electroluminescence) panel, fluorescent display tube, or the like. The liquid crystal display panel and the barrier display panel both can be also constructed by EL display panels.

Figure 12:
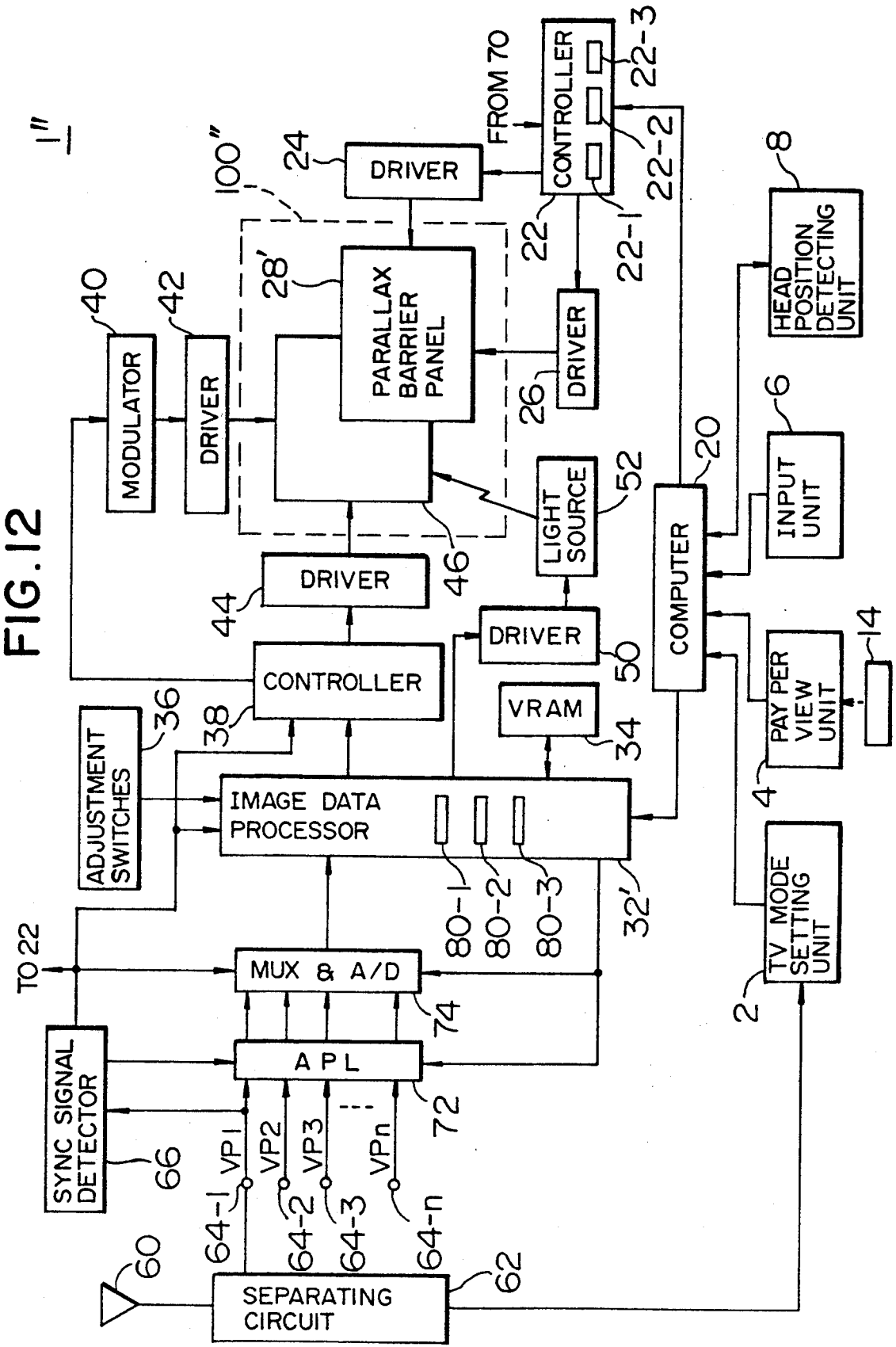
FIG. 12 is a diagram showing another modification of a 3D image display apparatus according to the invention.

Another modification 1" of the 3D image display apparatus 1 will now be described with reference to FIG. 12. In FIG. 12, the same component elements as those shown in FIG. 1 are designated by the same reference numerals and their descriptions are omitted here. Therefore, only points different from the 3D image display apparatus 1 shown in FIG. 1 will be described.

The 3D image display apparatus 1" shown in FIG. 12 is used only for a TV signal which is received and is constructed by omitting the circuit sections using the recorded image signal and the image signal by a communication from the apparatus 1 shown in FIG. 1. In a stereoscopic image display section 100" shown in FIG. 12, the enlarging section 56, driver 57, and controller 58 are omitted from the display section 100 shown in FIG. 1. In place of them, a panel 28' is formed so that a pixel pitch of the barrier display panel 28' is slightly narrower than that of the image display panel 46.

Figure 13:
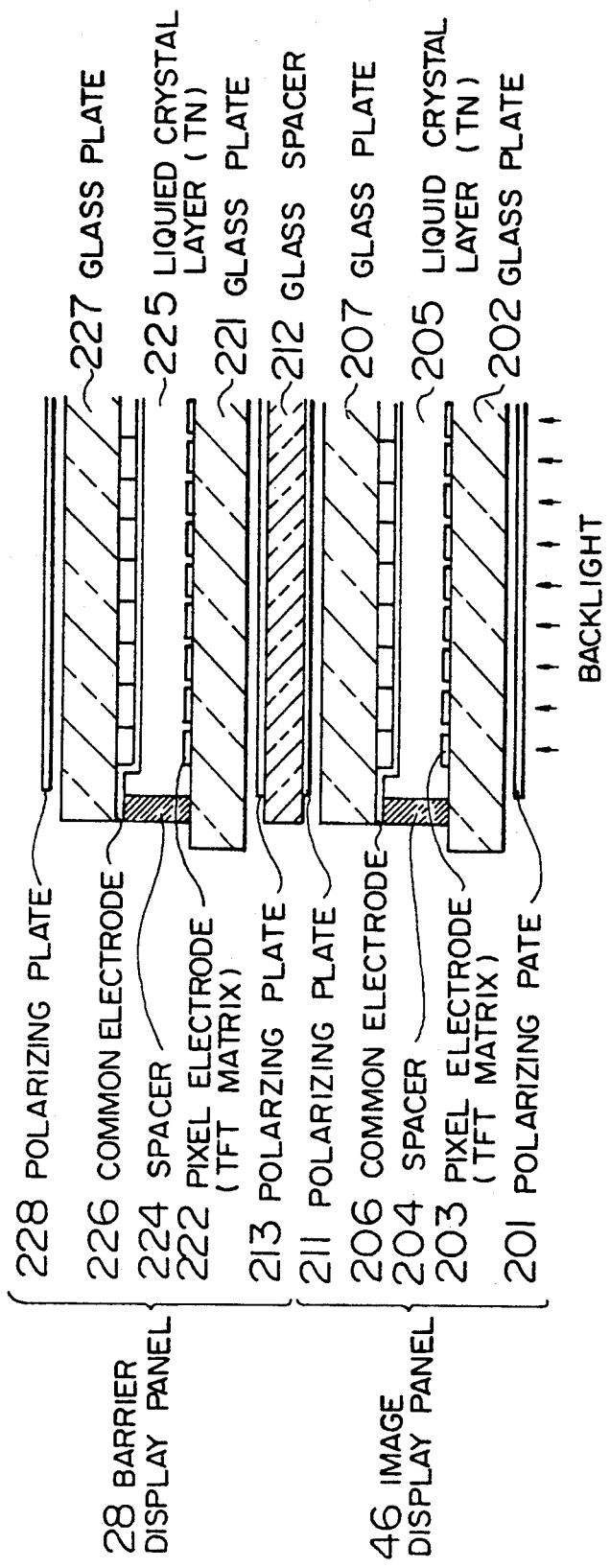
FIG. 13 is a diagram showing a display section 100" of the modification shown in FIG. 12.

FIG. 13 shows a constructional example of the display section 100" in which the image display panel 46 and the barrier display panel 28' are integrated. Since the panels 46 and 28' have substantially the same construction except that pixel pitch, only the construction of the panel 46 will be explained. In the panel 46, a liquid crystal layer 205 of the TN type is sandwiched by glass plates 202 and 207. A matrix 203 of pixel electrodes is formed between the layer 205 and the glass plate 202. A common electrode 206 is formed between the layer 205 and the glass plate 207. The glass plates 202 and 207 are sandwiched by polarizing plates 201 and 211. An interval between the glass plates 202 and 207 is specified by a spacer 204. A glass plate 212 as a spacer to specify the interval is also inserted between the polarizing plate 211 of the panel 46 and a polarizing plate 213 of the panel 28'.

Figure 14:
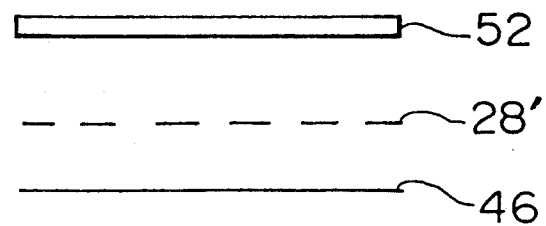
FIG. 14 is a diagram showing another construction of the display section 100.

A modification of the stereoscopic display section 100" will now be described with reference to FIG. 14. In the modification, the arrangement of the liquid crystal panels 28' and 46 is reversed. That is, the barrier display panel 28' is arranged near the light source 52. The image display panel 46 is arranged at a position away from the light source 52, that is, on the side of the viewer. In the above case as well, a pixel pitch of the panel 28' is also set so as to be narrower than that of the panel 46.

Figure 15:
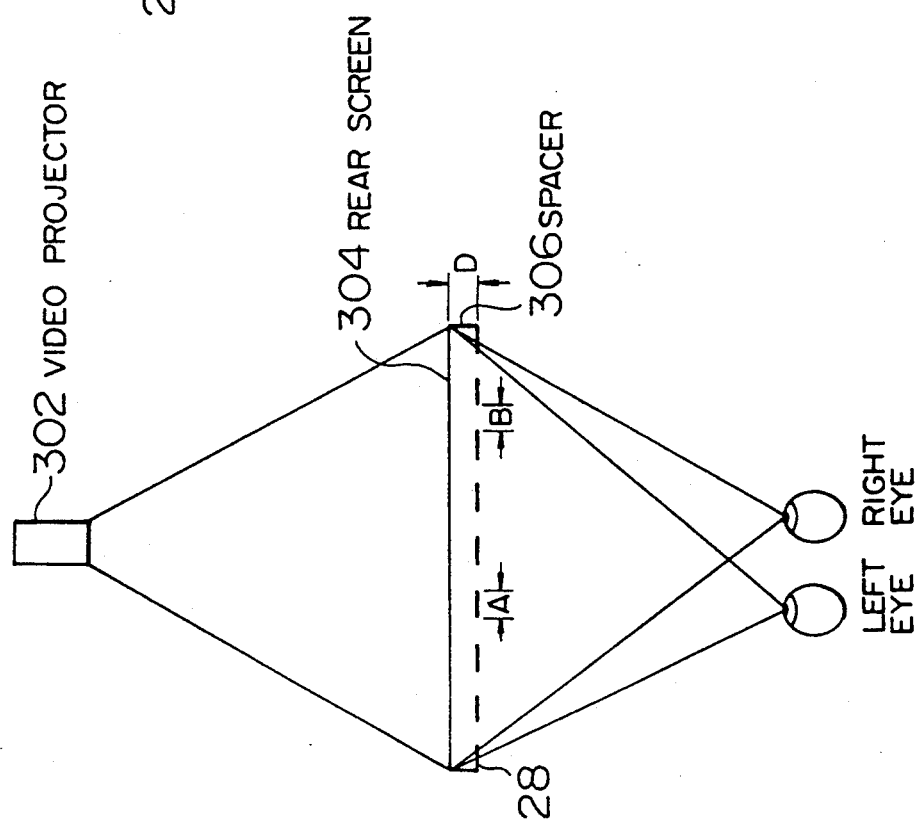
FIG. 15 is a diagram showing a 3D image display apparatus of two view points according to the invention using a screen.

Another modification of the 3D image display apparatus of the invention will now be described with reference to FIG. 15. In the modification, a constructional example of a 3D image display apparatus of the rear projection type using an electronic type barrier 28 is shown. The barrier display panel 28 is arranged at a position which is away from a rear screen 304 provided in front of a video projector 302 to the viewer side by only a predetermined distance D. An image is projected onto the rear screen 304 by the video projector 302. In a manner similar to the case of FIG. 1, the image is constructed by alternately arranging the images for the left eye and the images for the right eye like vertical stripes. When the viewer observes the image projected through the barrier of the panel 28, a parallax stereogram is derived. As will be also understood from the example, by using a cathode ray tube in place of the light source 52 and the image display panel 46 in the example of FIG. 1 and by forming a parallax barrier in front of the cathode ray tube, a stereoscopic image can be obtained. Further, a parallax panoramagram can be realized by setting an aperture ratio of the barrier stripes of the barrier on the panel 28 to 1/N (N is an integer) and by projecting the multi-direction images arranged like vertical stripes in correspondence to the aperture ratio onto the rear screen 304.

Figure 16:
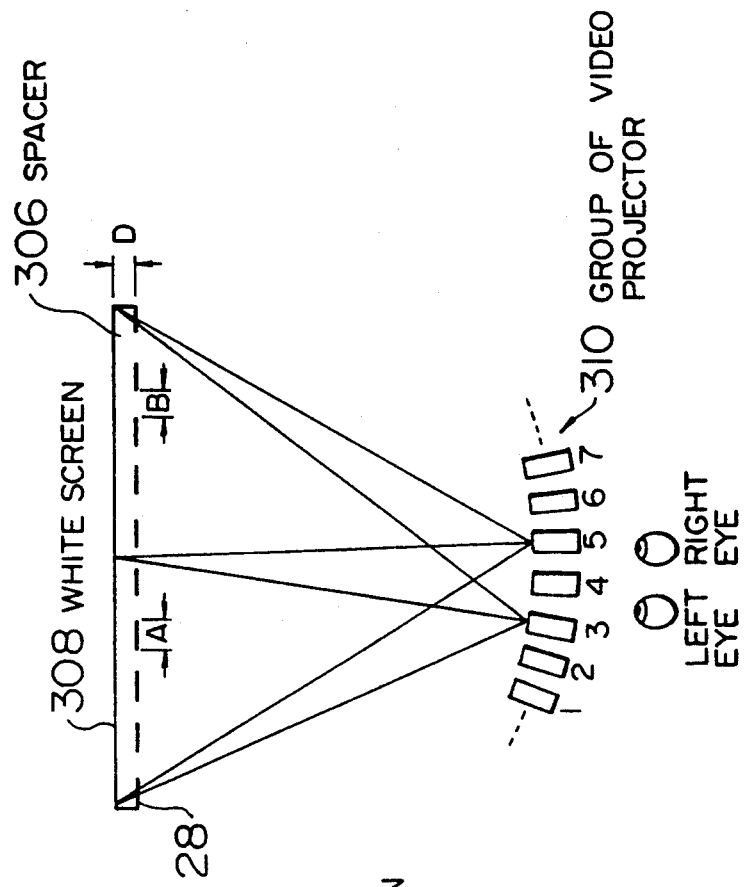
FIG. 16 is a diagram showing a 3D image display apparatus of multi-view points according to the invention using a screen.

FIG. 16 shows a constructional example of a 3D image display apparatus of the front projection type using a parallax barrier which has been electronically generated according to the invention. In the example, a video projector group 310 including a plurality of video projectors is arranged on the viewer side and an image is projected onto a white screen 308. The barrier display panel 28 is arranged between the video projector group 310 and the screen 308 so as to be located at a position away from the screen 308 by only the predetermined distance D. The images are projected onto the white screen 308 from a plurality of directions by the projector group 310, so that a multi-direction image, namely, an image for multi-eyes is derived. When the barrier on the panel 28 is shifted, a rotated stereoscopic image is derived without moving the viewer Various kinds of systems can be constructed by using the 3D image display apparatus described above. There is the foregoing false experience apparatus as one of such systems. As another system, by using the apparatus of the invention to a TV game, a game with a high presence can be enjoyed. In such a case as well, the multiplexed 3D image and voice signal are stored in the storage unit 10. An image signal received from a TV or the like can be modified in accordance with an interest of the viewer. That is, the reading operation of an image from the storage unit 10 is stopped and new data is added to the image signal stored in the VRAM 34 by using the computer 20. Consequently, the viewer can obtain an image having originality. Further, by storing signals for songs into the storage unit 10, the viewer can sing the songs with a high reality.

What is claimed is:

1. A display apparatus to display a three-dimensional (3D) image, comprising:
   image display means for displaying a two-dimensional (2D) image in response to an input 2D image signal and for displaying a 3D image in response to an input 3D image signal, said 3D image signal being a signal representing spatially multiplexed 2D images; and
   barrier display means having a barrier display panel of a transmitting type, for displaying a parallax barrier onto a portion of said barrier display panel corresponding to said 3D image such that said 3D image displayed by said image display means can be observed by use of gaps of said parallax barrier in a 3D image display mode, said barrier display means displaying no parallax barrier when said 2D image is displayed.

2. A computer system using a display apparatus according to claim 1, comprising:
   input means for inputting a command and data;
   storage means for storing said data; and
   arithmetic operating means for executing a desired arithmetic operation for said data in response to said command from said input means and supplying an operation result as one of said 2D and 3D image signal to said display apparatus.

3. An apparatus according to claim 1, wherein said barrier display means further includes means for changing a pattern of said parallax barrier in response to a pattern change command.

4. An apparatus according to claim 1, wherein said barrier display means includes:
   said barrier display panel;
   panel driving means for driving said barrier display panel; and
   barrier generation controlling means for dynamically controlling said barrier display panel in response to a pattern change command such that a pattern of the parallax barrier is dynamically changed with respect to at least one of a position and a density of said pattern.

5. An apparatus according to claim 4, wherein said parallax barrier pattern is a pattern which has an aperture ratio determined in accordance with a number of view points in a horizontal direction and which comprises a plurality of stripes.

6. An apparatus according to claim 1, wherein said image display means includes:
   an image display panel of a transmitting type to display said 3D image in response to said 3D image signal; and
   means for back-lighting said image display panel.

7. An apparatus according to claim 6, wherein said image display means further comprises means for controlling said backlight means such that said backlight means backlights said image display panel with a light amount for said 3D image more than that for said 2D image.

8. An apparatus according to claim 6, wherein said image display means further comprises enlarging means for enlarging said 3D image displayed on said image display panel.

9. An apparatus according to claim 8, wherein said enlarging means includes a Fresnel lens.

10. A display apparatus to display a three-dimensional (3D) image, comprising:
    image display means for displaying a two-dimensional (2D) image in response to an input 2D image signal in a 2D image display mode and for displaying a 3D image in response to an input 3D image signal in a 3D image display mode, wherein said image display means including:
    an image display panel of a transmitting type to display said 3D image in response to said 3D image signal; and
    means for back-lighting said image display panel;
    enlarging means for enlarging said 3D image displayed on said image display panel;
    barrier display means having a barrier display panel of a transmitting type, for displaying a parallax barrier onto said barrier display panel in such a manner that said 3D image which is displayed by said image display means can be observed by use of gaps of said parallax barrier in said 3D image display mode,
    wherein a pixel pitch of said image display panel is the same as that of said barrier display panel,
    magnification control means for controlling an enlargement magnification of said enlarging means in response to an input magnification command.

11. A display apparatus to display a three-dimensional (3D) image, comprising:
    image display means for displaying a two-dimensional (2D) image in response to an input 2D image signal in a 2D image display mode and for displaying a 3D image in response to an input 3D image signal in a 3D image display mode. wherein said image display means including:
    an image display panel of a transmitting type to display said 3D image in response to said 3D image signal; and
    means for back-lighting said image display panel;
    barrier display means having a barrier display panel of a transmitting type, for displaying a parallax barrier onto said barrier display panel in such a manner that said 3D image which is displayed by said image display means can be observed by use of gaps of said parallax barrier in said 3D image display mode,
    wherein each of said image display panel and said barrier display panel is arranged in such a manner that pixels are displace by ½ pixel every other line in one of horizontal and vertical directions.

12. A display apparatus to display a three-dimensional (3D) image, comprising:

image display means for displaying a two-dimensional (2D) image in response to an input 2D image signal in a 2D image display mode and for displaying a 3D image in response to an input 3D image signal in a 3D image display mode, wherein said image display means including:
an image display panel of a transmitting type to display said 3D image in response to said 3D image signal; and
means for back-lighting said image display panel;
barrier display means having a barrier display panel of a transmitting type, for displaying a parallax barrier onto said barrier display panel in such a manner that said 3D image which is displayed by said image display means can be observed by use of gaps of said parallax barrier in said 3D image display mode,
wherein said image display panel is for a color image display and said barrier display panel is for a black and white image display.

13. An apparatus according to claim 12, wherein a pixel pitch of said image display panel is wider than that of said barrier display panel by a predetermined magnification.

14. An apparatus according to claim 12, wherein said barrier display panel, said image display panel and said backlight means are arranged in the order stated as referenced beginning from a viewing side of said apparatus.

15. An apparatus according to claim 12, wherein said image display means further comprises enlarging means for enlarging said 3D image displayed on said image display panel.

16. An apparatus according to claim 15, wherein said enlarging means includes a Fresnel lens.

17. A display apparatus to display a three-dimensional (3D) image, comprising:
image display means for displaying a two-dimensional (2D) image in response to an input 2D image signal in a 2D image display mode and for displaying a 3D image in response to an input 3D image signal in a 3D image display mode, wherein said image display means including:
an image display panel of a transmitting type to display said 3D image in response to said 3D image signal; and
means for back-lighting said image display panel;
barrier display means having a barrier display panel of a transmitting type, for displaying a parallax barrier onto said barrier display panel in such a manner that said 3D image which is displayed by said image display means can be observed by use of gaps of said parallax barrier in said 3D image display mode,
wherein said image display panel, said barrier display panel and said backlight means are arranged in the order stated as referenced beginning rom a viewing side of said apparatus.

18. A display apparatus to display a three-dimensional (3D) image, comprising:
image display means for displaying a two-dimensional (2D) image in response to an input 2D image signal in a 2D image display mode and for displaying a 3D image in response to an input 3D image signal in a 3D image display mode, wherein said image display means includes;
a rear screen, and
image projecting means for projecting said 3D image onto said rear screen in response to said 3D image signal; and
barrier display means having a barrier display panel of a transmitting type, for displaying a parallax barrier onto said barrier display panel in such a manner that said 3D image which is displayed by said image display means can be observed by use of gaps of said parallax barrier in said 3D image display mode,
wherein said barrier display panel, said rear screen, and said image projecting means are arranged in the order stated as referenced beginning from a viewing side of said apparatus.

19. A display apparatus to display a three-dimensional (3D) image, comprising:
image display means for displaying a two-dimensional (2D) image in response to an input 2D image signal in a 2D image display mode and for displaying a 3D image in response to an input 3D image signal in a 3D image display mode, wherein said image display means includes:
a white screen; and
image projecting means for projecting said 3D image onto said white screen in response to said 3D image signal; and
barrier display means having a barrier display panel of a transmitting type, for displaying a parallax barrier onto said barrier display panel in such a manner that said 3D image which is displayed by said image display means can be image display mode,
wherein said image projecting means, said barrier display panel, and said white screen are arranged in the order stated as referenced beginning from a viewing side of said apparatus.

20. An apparatus according to claim 19, wherein said image projecting means includes at least one video projector.

21. A display apparatus to display a three-dimensional (3D) image, comprising:
image display means for displaying a two-dimensional (2D) image in response to an input 2D image signal in a 2D image display mode and for displaying a 3D image in response to an input 3D image signal in a 3D image display mode; and
barrier display means having a barrier display panel of a transmitting type, for displaying a parallax barrier onto said barrier display panel in such a manner that said 3D image which is displayed by said image display means can be observed by use of gaps of said parallax barrier in said 3D image display mode, said barrier display means including:
panel driving means for driving said barrier display panel; and
barrier generation controlling means for controlling said panel driving means in response to an input command such that a pattern of said parallax barrier is dynamically displayed onto said barrier display panel with respect to at least one of a position and a density of said pattern when a barrier generation command is given;
wherein said parallax barrier pattern is a lattice-shaped pattern having an aperture ratio determined in accordance with a number of view points in horizontal and vertical directions.

22. A display apparatus to display a three-dimensional (3D) image, comprising:

image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by use of gaps of said parallax barrier in said 3D image display mode, said barrier display means including:

panel driving means for driving said barrier display panel; and barrier generation controlling means for controlling said panel driving means in response to an input command such that a pattern of said parallax barrier is dynamically displayed onto said barrier display panel with respect to at least one of a position and a density of said pattern when a barrier generation command is given;

means for detecting a head position of a viewer in said 3D image display mode and for generating a pattern change command to said barrier generation controlling means in accordance with a detected head position such that said parallax barrier is moved on said barrier display panel by a distance corresponding to one display element of said 3D image when said detected head position is displaced by an almost distance between both eyes of a viewer, and wherein said 3D image is an image for two view points.

23. A display apparatus to display a three-dimensional (3D) image, comprising:

image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by used of gaps of said a parallax barrier in said 3D image display mode, said barrier display means including:

panel driving means for driving said barrier display panel; and barrier generation controlling means for controlling said panel driving means in response to an input command such that a pattern of said parallax barrier is dynamically displayed onto said barrier display panel with respect to at least one of a position and a density of said pattern when a barrier generation command is given;

means for generating a pattern change command to said barrier generation controlling means such that said parallax barrier is moved on said barrier display panel by a distance corresponding to one display element of said 3D image in response to an input rotation command, and wherein said 3D image is an image for multi-view points.

24. A display apparatus to display a three-dimensional (3D) image, comprising:

image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by used of gaps of said parallax barrier in said 3D image display mode, said barrier display means including:

panel driving means for driving said barrier display panel; and barrier generation controlling means for controlling said panel driving means in response to an input command such that a pattern of said parallax barrier is dynamically displayed onto said barrier display panel with respect to at least one of a position and a density of said pattern when a barrier generation command is given;

wherein said barrier generation controlling means includes means for controlling said barrier display means such that said parallax barrier is not displayed on said barrier display panel in said 2D image display mode and is displayed in said 3D image display mode.

25. An apparatus according to claim 24, wherein said image display means includes an image display panel of a self light emitting type.

26. An apparatus according to claim 25, wherein said image display panel of the self light emitting type is either one of a plasma display panel, an electroluminescence display panel, and a fluorescent display tube panel.

27. An apparatus according to claim 24, wherein said image display means includes:

an image display panel of a transmitting type for displaying said 3D image in response to said 3D image signal;

means for back-lighting said image display panel; and backlight controlling means for controlling said backlight means such that a light amount in said 3D image display mode from said backlight means is more than that in said 2D image display mode.

28. An apparatus according to claim 27, wherein said image display means includes means for displaying a mixture image of a 2D image and a 3D image on said image display panel in response to a mixture signal for said 2D and 3D images in a window mode, and said barrier generation controlling means includes:

means for controlling said barrier display means such that said parallax barrier is displayed at a portion of said barrier display panel corresponding to said 3D image in accordance with said mixture signal in said window mode.

29. An apparatus to claim 28, wherein said image display means further comprises:

means for controlling a luminance of a portion of said mixture signal corresponding to said 3D image in accordance with a luminance of said 2D image and an aperture ratio of said parallax barrier in said window mode.

30. A TV receiver, comprising:

a display apparatus to display a three-dimensional (3D) image, comprising image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by use of gaps of said parallax barrier in said 3D image display mode;

receiving means for receiving an input multiplexed image/audio/data signal;

separating means for separating an image signal and a data signal from said multiplexed image/audio/data signal and for supplying said image signal to said display apparatus; and setting means for setting said display apparatus in either one of said 3D image display mode, said 2D image display mode and a window mode in accordance with control data of said data signal.

31. A TV receiver according to claim 30, further comprising:

pay-per-view means for enabling said display apparatus to be selectively set in said 3D image display mode in accordance with a preset parameter of a medium.

32. A TV receiver according to claim 30, further comprising:

storage means for storing a compressed image signal;

compressing/expanding means for compressing said separated image signal to store the same into said storage means and for reading out the compressed image signal from said storage means to expand and supply the same to said display apparatus; and input means for setting said display apparatus in either one of said 3D image display mode, said 2D image display mode, and a window mode when said compressed image signal should be read out from said storage means.

33. A TV telephone system, comprising:

a display apparatus to display a three-dimensional (3D) image, comprising image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by use of gaps of said parallax barrier in said 3D image display mode;

communicating means for communicating with an external equipment through a communication line;

TV camera means for photographing a viewer and generating a transmission image signal;

synthesizing/separating means for producing a transmission signal including said transmission image signal from said TV camera means and an input transmission voice signal, for supplying said transmission signal to said communicating means, for separating from a reception signal a reception image signal and a reception voice signal, and for supplying said reception image signal as said 3D image signal or said 2D image signal to said display apparatus; and voice converting means for converting said input transmission voice into said input transmission voice signal, for supplying said input transmission voice signal to said synthesizing/separating means, and for converting said reception voice signal from said synthesizing/separating means into a reception voice.

34. A TV meeting system, comprising:

a display apparatus to display a three-dimensional (3D) image, comprising image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by used of gaps of said parallax barrier in said 3D image display mode;

communicating means for communicating with an external equipment through a communication line;

TV camera means for photographing a viewer and generating a transmission image signal;

synthesizing/separating means for producing a transmission signal including said transmission image signal from said TV camera means and an input transmission voice signal, for supplying said transmission signal to said communicating means, for separating from a reception signal a reception image signal and a reception voice signal, and for supplying said reception image signal as said 3D image signal or said 2D image signal to said display apparatus; and voice converting means for converting said input transmission voice into said input transmission voice signal and supplying the same to said synthesizing/separating means, and for converting said reception voice signal from said synthesizing/separating means into a reception voice.

35. A false experience apparatus, comprising:

a display apparatus to display a three-dimensional (3D) image, comprising image display means for displaying a two-dimensional (2D) image in response to an input 2D image signal in a 2D image display mode and for displaying a 3D image in response to an input 3D image signal in a 3D image display mode; and barrier display means having a barrier display panel of a transmitting type, for displaying a parallax barrier onto said barrier display panel in such a manner that said 3D image which is displayed by said image display means can be observed by use of gaps of said parallax barrier in said 3D image display mode;

a storage unit for storing an image/voice signal;

separating means for reading out said image/voice signal from said storage unit to separate from a read out image/voice signal an image signal and a voice signal, and for supplying said image signal as one of said 2D and 3D image signals to said display apparatus; and reproducing means for reproducing a voice from said voice signal, wherein said image signal is indicative of a situation desired by a viewer and said voice signal is indicative of an explanation of said situation.

36. A method of displaying a three-dimensional image, comprising the steps of:
- displaying a three-dimensional (3D) image in a 3D image display mode;
- displaying a two-dimensional (2D) image in a 2D image display mode;
- displaying the 2D and 3D image signal in a mixing mode;
- displaying a parallax barrier in the 3D image display mode;
- inhibiting the display of the parallax barrier in the 2D image display mode; and
- displaying a parallax barrier in one of inside and outside of a window in the mixing mode.

37. A method according to claim 36, further comprising the steps of:
- generating a movement command when a head position of a viewer is displaced by an almost distance between both eyes of the viewer, in which said 3D image is for two view points;
- generating a rotation command, in which said 3D image is for multi-view points; and
- moving the parallax barrier by a distance of one pixel of the 3D image in response to said movement command or said rotation command, in which said 3D image is displayed by pixels and said parallax barrier is displayed on a pixel unit basis.

38. A method according to claim 36, wherein each of the steps of displaying said parallax barrier comprises the step of:
- displaying the parallax barrier having an aperture ratio determined in accordance with the number of view points of the 3D image.

39. A method according to claim 38, further comprising the step of:
- controlling a luminance of the 3D image in the mixing mode in accordance with a luminance of the 2D image and the aperture ratio of said parallax barrier.

* * * * *